United States Patent

[11] 3,534,706

| | | |
|---|---|---|
| [72] | Inventor | Roger L. Crispell<br>Bloomfield Hills, Mich. |
| [21] | Appl. No. | 786,188 |
| [22] | Filed | Dec. 23, 1968 |
| [45] | Patented | Oct. 20, 1970 |
| [73] | Assignee | General Motors Corporation,<br>Detroit, Mich.,<br>a corporation of Delaware |

[54] CONTROL KNOB ARRANGEMENT FOR A RANGE
4 Claims, 6 Drawing Figs.

[52] U.S. Cl. ................................................ 116/124,
116/133
[51] Int. Cl. ................................................ G09f 9/00
[50] Field of Search .......................................... 116/124,
133, 124.4, 129(E), 129(F), 116, 57; 200/167;
219/(Consulted); 338/(Consulted)

[56] References Cited
UNITED STATES PATENTS
2,607,870  8/1952  Sheidler ........................ 200/167

| 2,759,447 | 8/1956 | Helgeby ........................ | 116/57 |
| 2,889,800 | 6/1959 | Schroeder ..................... | 116/124 |
| 2,918,555 | 12/1959 | Lindberg ....................... | 200/167 |
| 3,404,657 | 10/1968 | Zmuda .......................... | 116/124 |
| FOREIGN PATENTS | | | |
| 599,977 | 3/1948 | Great Britain ................ | 116/129 |
| 641,271 | 8/1950 | Great Britain ................ | 116/129 |

*Primary Examiner*—Louis J. Capozi
*Attorneys*—Warren E. Finken and Frederick M. Ritchie

ABSTRACT: In the preferred form a control knob and energy supply indicating means for a domestic range, which includes a brightly colored arcuate strip contrasting with the background color of a control panel so that rotation of the unitary control knob as a result of the configuration of the knob will progressively uncover or cover the arcuate strip and thus give a visual indication of an energy supply setting as well as the amount of energy supplied to a heating element on the range whose energy supply is regulated by a control associated with the control knob.

Patented Oct. 20, 1970
3,534,706
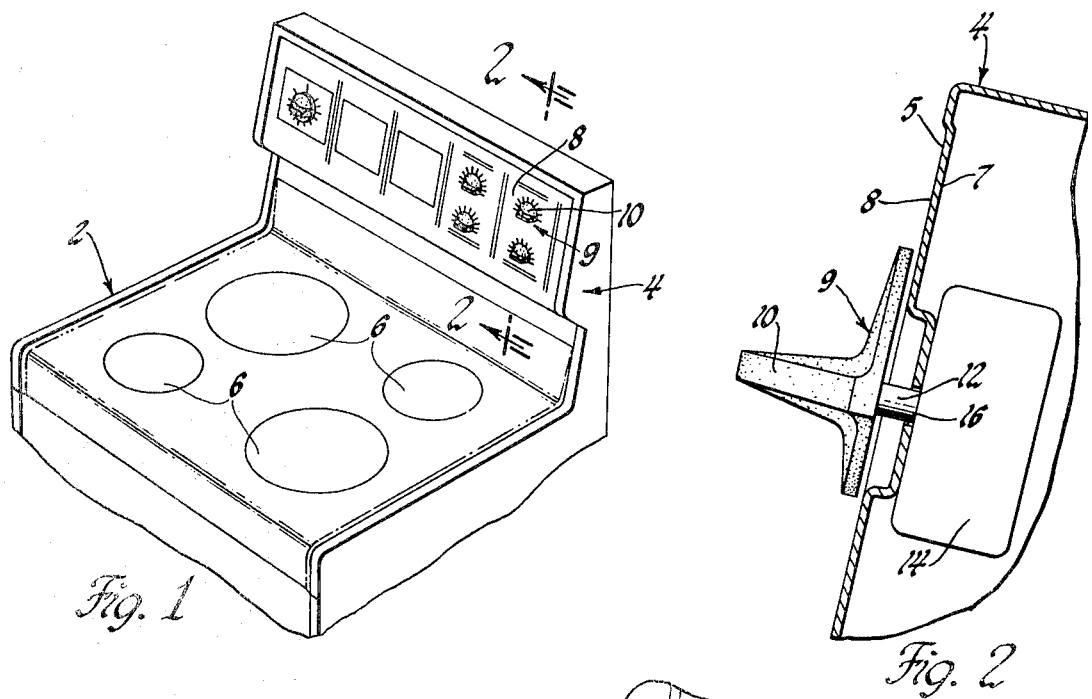
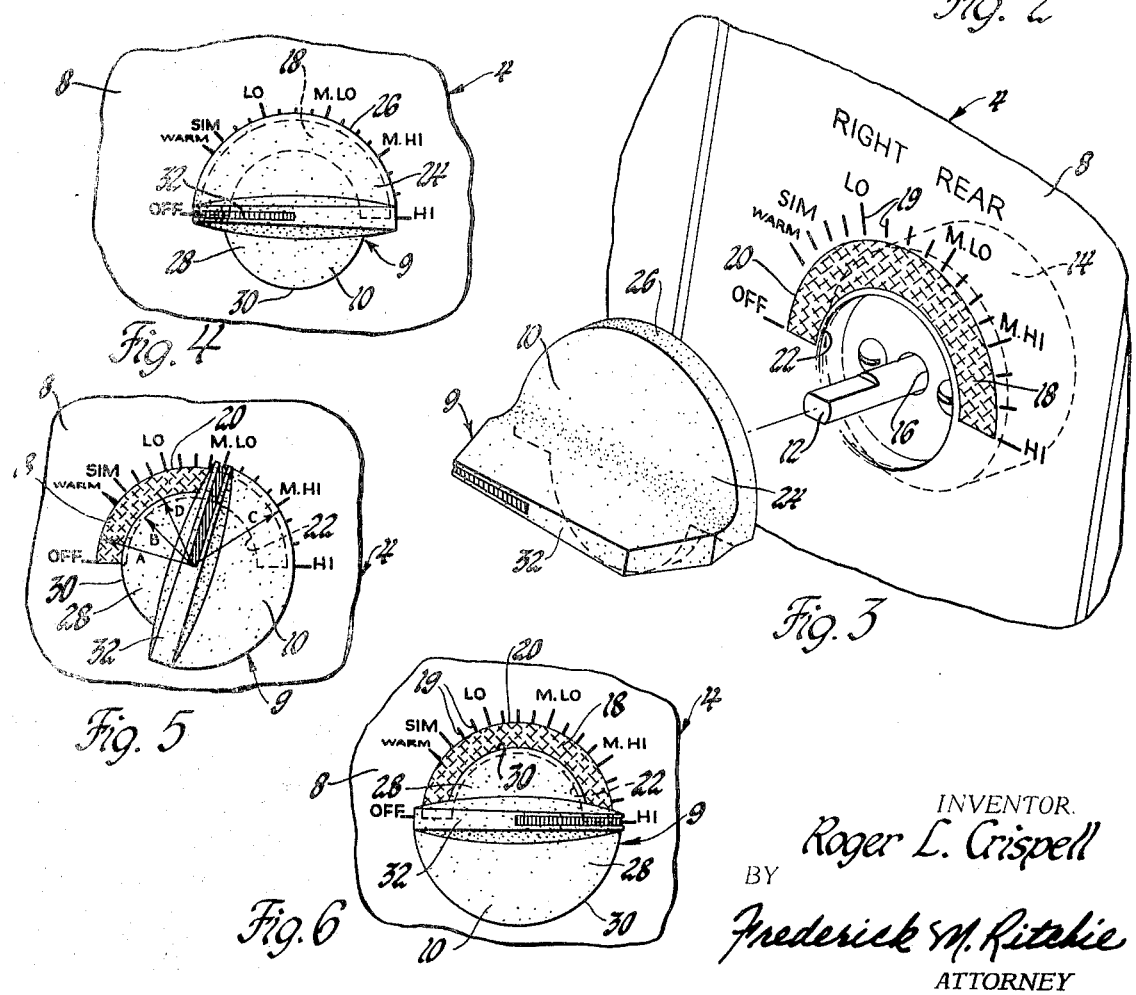
INVENTOR.
Roger L. Crispell
BY
Frederick M. Ritchie
ATTORNEY

CONTROL KNOB ARRANGEMENT FOR A RANGE

This invention relates to control knobs for domestic ranges and other appliances wherein the control knob operates the control means for an operating function with rotation of the control knob providing a progressive increase or decrease of the operating function, and, wherein the user of the domestic appliance is interested in an indication in the amount of operating functions being utilized at any given point of time.

In some cases it is particularly desirable that the user of a domestic appliance have a visual indication of the state of control of an operating function of the domestic appliance. It is particularly desirable that the mode of operation of the operating function is readily ascertainable by quick glance at the visual indication.

In particular, the control knob and energy supply indicating means of the present invention is useful on a domestic range wherein the user of the surface heating units of the range would find it beneficial to know at any given point of time not only that a particular heating unit is on and, thus, hot but also the amount of energy being supplied to the heating unit and thus its relative temperature. The present invention provides a control knob and the energy supply indicating means which provides at a quick glance a visual indication as to the relative amount of energy being supplied and, thus, the temperature of the heating element.

The primary object of the present invention is to provide an improved control knob and an energy indicating means which utilizes only one moving part, is easy to use, and provides a quick easily ascertainable readout.

Another object of the present invention is to provide a control knob, an energy and supply indicating means which is simple and relatively inexpensive to manufacture and assemble. In keeping with this object it is desirable that the control knob and energy and supply indicating means have relatively few parts and need no separate light source to provide the necessary illumination for the visual indication readout.

Referring to the accompanying drawings:

FIG. 1 is a perspective of the domestic range utilizing the control knob and energy supply indicating means of the present invention;

FIG. 2 is a partially sectional side elevation of the control console and the upper part of the range of FIG. 1;

FIG. 3 is an exploded perspective of part of the control panel of the range of FIG. 1;

FIG. 4 is a front elevation of the control knob and energy supply indicating means of the present invention with the control knob in the OFF position;

FIG. 5 is a front elevation of the control knob energy supply indicating means of the present invention with the control knob in a partially ON position;

FIG. 6 is a front elevation of the control knob and energy supply indicating means of the present invention with the control knob in a totally ON or HI position.

In accordance with the present invention FIGS. 1, 2 and 3 disclose a domestic range 2 having a control console 4 and a plurality of surface heating units 6. The control panel 8 of the control console 4 has a front surface 5 and back surface 7 and is provided with a plurality of control knob and energy supply indicating means 9 which are the subject of the present invention. There is one control knob and energy supply indicating means 9 for each of the surface heating units 6, four of which are shown as typical. Each means 9 comprises, in general, a knob 10, a control 14, and an interposed panel 8. Since all of the control knob and energy supply indicating means are similar in both structure and operation, only one will be described in detail below.

Each control knob 10 is mounted on a control shaft 12 and is characterized as a one-piece or unitary plastic molding. The control shaft 12 is rotatably mounted with respect to the control panel 8 of the control console 4. Rotation of the control shaft 12 operates a control 14 which is located within the control console 4 behind the control panel 8. Thus, for each control knob 10 there is a control 14 and, therefore, there is a control 14 for each of the surface heating units 6. Each control 14 regulates the energy supply to its respective surface heating unit 6. In the case of an electric range, the control 14 would regulate the electrical current available to an electrical resistance unit which would be the surface heating unit 6, and, therefore, indicate the temperature of the surface heating unit as a factor of heat output. In the case of a gas range the control 14 would regulate the gas supply through a gas burner which would be the surface heating unit 6, and, thus, again indicate the temperature of the surface heating unit as a factor of heat output.

FIG. 3 shows a portion of the control panel 8 and a control knob 10 in an exploded perspective. For each of the control knobs 10, the control panel 8 is provided with a circular opening 16 through which a control shaft 12 extends. An elongated colored arcuate segment 18 is also provided on the front face of the control panel 8 concentric with the shaft opening 16. The arcuate segment 18 has an outer edge 20 and an inner edge 22 having radii of A and B respectively from the center of control shaft 12. The arcuate segment in the preferred form is 180° in circumferential length, however, it is also within the purview of this invention that the arcuate segment be of a circumferential length less then 180°. It is necessary for the teachings of this invention that the arcuate segment 18 be of a color distinctly different or contrasting to the color of the front face of the control panel 8. This is necessary in that the amount of the colored arcuate segment 18 showing to the user of the range will provide the visual indication necessary in the teaching of this invention. The amount of the arcuate segment 18 showing is dependent on the amount of this strip which is covered or uncovered by the control knob 10 as will be later described. Graduated markings or energy supply indicia 19 may also be provided at the outer circumferential edge or outboard of the colored arcuate segment 18. Several of these markings may be designated so as to represent the relative temperature of the surface heating unit corresponding to each individual control knob. It is within the purview of this invention to utilize the colored arcuate segment either with or without these graduated markings.

FIG. 4 discloses the control knob 10 of the subject invention with a control knob rotated to an OFF position. The control knob 10 is generally circular and has a stepped circumference. The control knob comprises a first portion 24 having a circumferential edge 26 with a radius C and a second portion 28 having a circumferential edge 30 with a radius D. Both the circumferential edges 26 and 30 are concentric with the control shaft 12 upon which the control knob 10 is mounted. Therefore, the circumferential edges 26 and 30 are also approximately concentric with the inner edge 22 and the outer edge 20 of the arcuate segment 18 which is concentric with the opening 16 of the control panel through which the control shaft 12 extends. Furthermore, the radius C of the circumferential edge 26 of the first portion 24 is greater than radius D of the circumferential edge 30 of the second portion 28. The radius C of circumferential edge 26 also is greater than radius A of the outer edge 20 of the arcuate segment 18. Therefore, when the control knob 10 is in a position shown in FIG. 4 the first portion 24 of the control knob 10 will cover the arcuate segment 18. The radius D of circumferential edge 30 of the second portion of the control knob 10 is smaller than radius A of the outer edge 20 of the arcuate segment 18. The radius D of circumferential edge 30 may also be smaller or the same size as radius B of the inner edge 22 of the arcuate section 18. However, in the preferred form the radius D of circumferential edge 30 is of slightly greater than radius B of the inner edge 22 of the arcuate segment 18. Since the radius D of circumferential edge 30 is smaller than radius A of the outer edge 20 of the arcuate segment 18, when the control knob 10 is rotated to a position such as that shown in FIG. 5 or 6 at least a portion of the arcuate segment will be uncovered and, therefore, be visible to the user of the range.

The control knob the is also provided with an outwardly projection portion or finger grip 32 which in cooperation with the indicia 19 serves as a pointer to indicate an energy supply setting. The finger grip 32 separates the first portion 24 from the second portion 28. The finger grip need be of no particular size or shape but it is advantageous for the purpose of manually turning the control knob 10. As shown in FIGS. 4, 5 and 6 the finger grip in the preferred form extends diametrically through the center of the control knob and separates the first portion 24 from the second portion 28. The length of the finger grip 32 and the preferred form is equal to the diameter of a circle of the same size as the semicircular first portion 24. Therefore, the ends of the finger grip 32 mate with and form part of the circumferential edge 26. Since the finger grip 32 has physical width, the circumferential edge 26 extends for more than 180°, such as 190°, while the circumferential edge 30 is less than 180°. This is particularly advantageous when the control knob 10 is used with an arcuate segment 18 of 180°. When the control knob 10 is in the OFF position as shown in FIG. 4 and with the first portion 24 having a circumferential length greater than 180°, the first portion 24 of the control knob completely covers the arcuate segment 18 and thus provides for slight error or tolerance in the positioning of the control knob 10 on the control shaft 12. Even if the arcuate segment 18 is less than 180°, it is still advantageous that the circumferential length of outer edge 26 of the first portion 24 be greater than the length of the arcuate segment 18 and still may be slightly larger than 180° as shown.

When the control knob 10 is rotated in clockwise direction from the OFF position of FIG. 4 to the HI position in FIG. 6, the control shaft 12 rotates to operate the control 14 which progressively allows a greater quantity of energy supply, such as electricity or gas, to pass through the surface heating unit 6. Thus, the heat output or temperature of the surface heating unit 6 is controlled by the position of the control knob 10 and will progressively increase or decrease proportionately to the amount of rotation of the control knob 10. At the same time that the control knob 10 operates control 14 and thus regulates the heat output of the surface heating unit, the control knob 10 also provides a second function. As the control knob 10 rotates from an OFF position shown in FIG. 5 to the totally on HI position of FIG. 6, the first portion 24 of the control knob rotates clockwise thus progressively uncovering the colored arcuate segment 18. FIG. 4 shows a control knob 10 in an OFF position. This position is the end of travel of the control knob 10 and control shaft 12 when rotated in a counterclockwise position. In this position the first portion 24 of the control knob 10 totally covers the arcuate segment 18. FIG. 6 shows the control knob 10 and thus the control shaft 12 rotated clockwise to its furthest position or HI position. In this position the first portion 24 of the control knob has been rotated clockwise so as to totally uncover the arcuate segment 18. This position is the totally ON position in which the control 14 allows the maximum energy supply to the surface heating unit. Although FIG. 6 shows the arcuate segment 18 uncovered and the totally ON or HI position of the control knob as being approximately 180° of rotation from the totally OFF position, it is to be understood as stated above that the arcuate segment uncovered and thus the totally ON or HI position of the control knob 10 may be less than 180°. FIG. 5 discloses the control knob 10 in an intermediate position or M.LO in which only a portion of the arcuate segment 18 is uncovered and in which the control shaft 12 has been rotated to an intermediate position so that any energy supply less than total and greater than OFF is provided. As the control knob 10 is rotated from the OFF position of FIG. 4 to the HI position of FIG. 6, or any position intermediate thereof, the arcuate segment 18 is uncovered by the first portion 24 of the control knob 10 proportionately to the control of the energy supply by the control 14 to the surface heating unit 6. Thus, the amount of the arcuate segment 18 is visible to the user of the range, is proportional to the energy supplied to the surface heating unit and, thus, is an indication of the temperature of the surface heating unit.

In the preferred form the color of the arcuate strip 18 contrasts with the color of the control panel 8 and the control knob 10. One embodiment might include a white control panel 8 and a white knob 10, with the color of the arcuate segment 18 being provided by bright orange or red paint or enamel with the arcuate segment 18 being of a radial width of .320 inches. The radii A and B from the center of the control shaft 12 to the edges 20 and 22 of the arcuate segment 18 would be 1.000 inch and .680 inch respectively while the radii C and D of the edges 26 and 30 of the control knob 10 would be 1.062 inch and .750 inch respectively. With this arrangement, the user of the range could tell with a quick glance from any reasonable distance, such as from across the kitchen, the relative temperature of each surface heating unit 6 by the amount of the colored arcuate segment 18 showing above the control knob 10 associated with each surface heating unit 6. Another possible embodiment of the present invention would include a black control panel 8 and a black control knob 10 used in conjunction with a bright orange or red arcuate segment 18. However, it is within the purview of this invention to use any color for the arcuate segment 18 which contrasts with the color of control panel and control knob 10 so that the amount of the arcuate segment 18 which is uncovered is readily distinguishable.

It is to be understood that other indicia can be used with the control knob and energy supply indicating means. As stated above, graduated markings 19 may also be positioned around the outer edge 20 of the colored arcuate segment 18. Furthermore, the right end of the finger grip 32 of the control knob 10 as shown in FIG. 4 may be provided with a colored portion 34. This colored portion 34 may be of the same color as the arcuate segment 18 and is used to indicate the position or setting of the control knob 10 with respect to the graduated markings 19.

It will also be apparent that the control knob and energy supply indicating means has but one movable part, the control knob 10, and is relatively easy and inexpensive to manufacture. The control knob and energy indicating means provides an easily attainable readout or indication of the position of the control knob and the relative utilization of an energy supply associated therewith. While the control knob and energy supply indicating means has been shown in the preferred form for use on a domestic range, it is to be understood that this arrangement may be utilized to indicate the state of an operating function or an energy supply on other domestic appliances wherein the state of the operating function is selected by a manual control knob.

I claim:

1. In combination with a controlled element in a domestic appliance adapted to be connected to a source of energy, a control knob and energy supply indicating means comprising: a control panel, said control panel having a front surface, a control operable for controlling the energy supplied to said controlled element, said control being located behind said front surface, a shaft connected to said control and movably mounted with respect thereto for operating said control, said shaft extending substantially perpendicularly through said control panel, a unitary control knob mounted on said shaft near said front surface of said control panel whereby movement of said control knob will impart movement to said shaft so as to operate said control, a segment positioned on said front surface of said control panel substantially equidistant from said shaft during movement of said control knob, said segment being of color contrasting to the color of said front surface of said control panel and having an inner and outer edge, and graduated markings for said control outboard of said segment relative to said control knob and adjacently coextensive with said outer edge, said control knob having a first and a second portion, said first portion of said control knob having a dimension extending perpendicularly from the center of said shaft toward an edge of said segment at least equal to the distance from the center of said shaft to the outer edge of said segment but less than the distance to cover said graduated markings, said second portion of said control knob having a dimension in a direction substantially perpendicular to an edge of said segment smaller than the distance from the center of said shaft to the outer edge of said segment, whereby said control knob may be moved with respect to said segment so as sequentially to progressively uncover said segment upon a first movement of said control knob in one direction and to progressively cover said segment upon movement of said control knob in the opposite direction without covering said graduated markings during movement of said control knob in either direction, said control in response to the movement of said control knob adapted for controlling the energy supplied to said controlled element proportionately to the amount of said segment uncovered by said control knob, and said control knob, said segment and said graduated markings cooperating to provide at a quick glance a visual indication as to the relative amount of energy being supplied to the controlled element.

2. The combination of claim 1 wherein said unitary control knob is a one-piece molded plastic member having a finger grip portion at the junction of said first and second portions of said knob.

3. In combination with a surface heating unit for a cooking appliance adapted to be connected to a source of energy, a control knob and energy supply indicating means comprising:

a control panel, said control panel having front and back surfaces, a control adapted for controlling the energy supplied to said surface heating unit, said control being located adjacent said back surface, a shaft connected to said control and rotatably mounted with respect thereto for operating said control, said shaft extending substantially perpendicular through said control panel, a unitary control knob mounted on said shaft near said front surface of said control panel whereby a rotary motion of said control knob will impart a rotary motion to said shaft so as to operate said control, an arcuate segment positioned on said front surface of said control panel substantially concentric to said shaft, said arcuate segment being of color contrasting to the color of said front surface of said control panel, and graduated markings for said control radially outboard of said arcuate segment and substantially coextensive therewith, said control knob being generally circular and having a first portion and a second portion, said first portion of said control knob having a radius larger than the radial distance from the center of said shaft to the outer edge of said arcuate segment but less than the distance to cover said graduated markings, said second portion of said control knob having a radius smaller than the radial distance from the center of said shaft to the outer edge of said arcuate segment, whereby said control knob may be rotated with respect to said arcuate segment so that said first portion of said control knob will sequentially progressively uncover said arcuate segment upon rotation of said control knob in one direction and progressively cover said arcuate segment upon rotation of said control knob in the opposite direction without covering said graduated markings during rotation of said control knob in either direction, said control for said surface heating unit in response to the rotation of said control knob adapted for controlling the energy supplied to said surface heating unit proportionally to the amount of arcuate segment uncovered by said control knob, and said control knob, said arcuate segment and said graduated markings cooperating to provide at a quick glance a visual indication as to the relative amount of energy being supplied to the surface heating unit.

4. In combination with a surface heating unit for a cooking appliance adapted to be connected to a source of energy, a control knob and energy supply indicating means, comprising:

a control panel, said control panel having front and back surfaces, a control adapted for controlling the energy supplied to said surface heating unit, said control being located adjacent said back surface, a shaft connected to said control and rotatably mounted with respect thereto for operating said control, said shaft extending substantially perpendicular through said control panel, a unitary control knob mounted on said shaft near said front surface of said control panel whereby rotary motion of said control knob will impart a rotary motion to said shaft so as to operate said control, an arcuate segment positioned on said front surface of said control panel substantially concentric to said shaft, said arcuate segment being of color contrasting to the color of said front surface of said control panel, said arcuate segment having an inner and outer edge, and graduated markings for said control outboard of said arcuate segment relative to said control knob and adjacently coextensive with said outer edge, said control knob being generally circular and having a first portion and a second portion, said first portion of said control knob having a radius larger than the radial distance from the center of said shaft to said outer edge of said arcuate segment but less than the distance to cover said graduated markings, said second portion of said control knob having a radius smaller than the radial distance from the center of said shaft to said outer edge of said arcuate segment and greater than the radial distance from the center of said shaft to said inner edge of said arcuate segment, said first portion of said control knob having a circumferential length larger than the circumferential length of said arcuate segment, whereby said control knob may be rotated with respect to said arcuate segment so that said first portion of said control knob will sequentially progressively uncover said arcuate segment upon rotation of said control knob in a first direction and progressively cover said arcuate segment upon rotation of said control knob in the opposite direction without covering said graduated markings during rotation of said control knob in either direction, said control in response to the rotary motion of said shaft adapted for controlling the energy supplied to said surface heating unit proportionally to the amount of arcuate segment uncovered by said control knob, and said control knob, said arcuate segment and said graduated markings cooperating to provide at a quick glance a visual indication as to the relative amount of energy being supplied to the surface heating unit.